Jan. 23, 1951    M. A. PARAGE    2,538,979
INDUCTION FURNACE
Filed Aug. 7, 1947    6 Sheets-Sheet 1
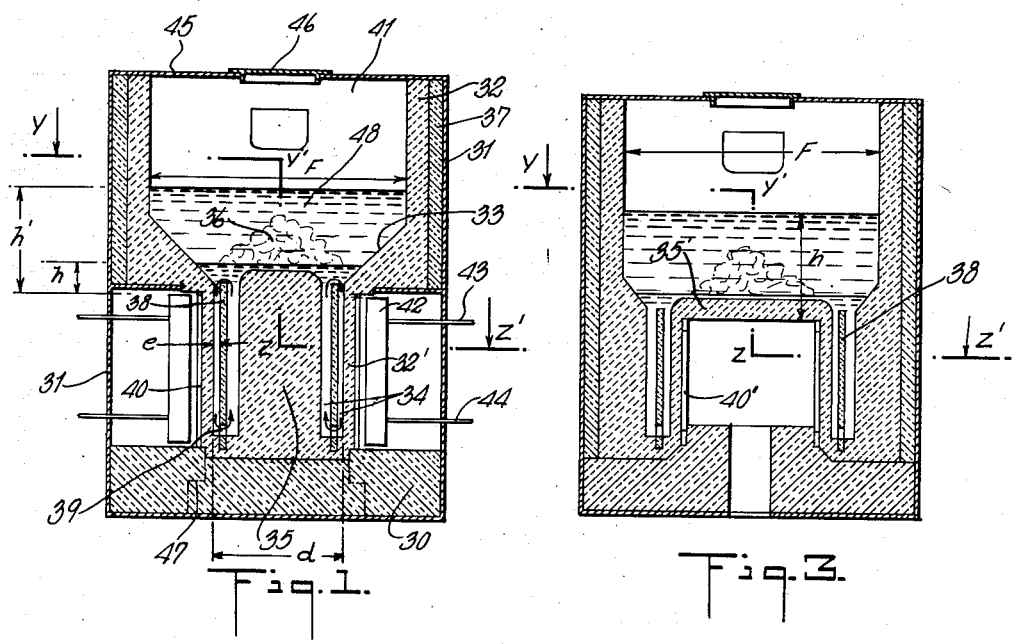
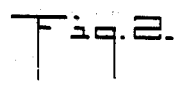
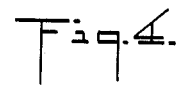
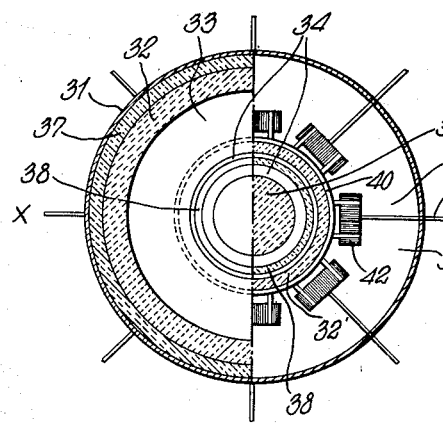
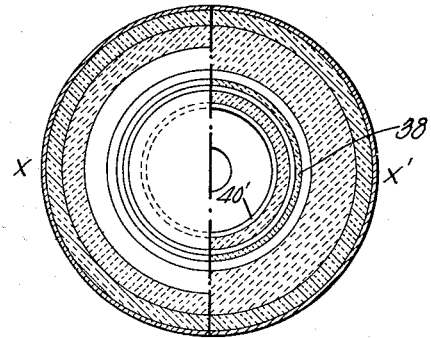
INVENTOR.
MAURICE AUGUSTIN PARAGE
BY
Dale A. Bauer
ATTORNEY INVENTOR.
MAURICE AUGUSTIN PARAGE
BY
Dale H Bauer
ATTORNEY Jan. 23, 1951 M. A. PARAGE 2,538,979
INDUCTION FURNACE
Filed Aug. 7, 1947 6 Sheets—Sheet 3

INVENTOR.
MAURICE AUGUSTIN PARAGE
BY
Dale A Bauer
ATTORNEY

Jan. 23, 1951　　　　　M. A. PARAGE　　　　2,538,979
INDUCTION FURNACE

Filed Aug. 7, 1947　　　　　　　　　　　　6 Sheets-Sheet 4

INVENTOR.
MAURICE AUGUSTIN PARAGE
BY
Dale A Bauer
ATTORNEY

Jan. 23, 1951  M. A. PARAGE  2,538,979
INDUCTION FURNACE
Filed Aug. 7, 1947  6 Sheets-Sheet 5

INVENTOR.
MAURICE AUGUSTIN PARAGE
BY
Dale A Bauer
ATTORNEY.

Jan. 23, 1951        M. A. PARAGE        2,538,979
INDUCTION FURNACE
Filed Aug. 7, 1947                            6 Sheets-Sheet 6

INVENTOR.
MAURICE AUGUSTIN PARAGE
BY
Dale A Bauer
ATTORNEY

Patented Jan. 23, 1951

2,538,979

UNITED STATES PATENT OFFICE 2,538,979

INDUCTION FURNACE

Maurice Augustin Parage, Paris, France, assignor to Societe Generale d'Applications Electro-Thermiques, Boulogne-Billancourt, France Application August 7, 1947, Serial No. 767,251
In France August 19, 1941

Section 1, Public Law 690, August 8, 1946
Patent expires August 19, 1961

10 Claims. (Cl. 13—29)

This invention relates to metallurgy and particularly to a metallurgical induction furnace. However, the furnace itself embodies novel conceptions that are adapted to fields other than metallurgy. It is understood that the particular description which is related to metallurgy is not a limitation. The invention particularly relates to the metallurgy of light metals and their alloys.

An object of the present invention is to provide an electric induction furnace of superior design for the treatment of easily oxidized metals and the alloys of light metals. Light metal alloys have the inconvenience of employing as their principal constituents metals that are very easily oxidized, the oxides of which have a fusion point much higher than the base metal, and which are accordingly capable of remaining in the solid state in suspension in the bath of melted metal. Furthermore, the said alloys generally contain an important proportion of additional metal, which is often heavier than the base metal and accordingly of a low degree of miscibility with it, which produces heterogeneity in metal cast from the bath. Furthermore, it is desirable that during the course of making the alloys the temperature of the bath should be maintained within sufficiently close limits and sufficiently uniform limits so that the purification shall be complete, the cast product of good quality and the deposits of oxide reduced to the minimum.

All these requirements show that a fusion by induction is indicated, that will provoke within the mass of metal movements of agitation, but attempts to employ it have shown that the working or stirring that occurs within the molten metal is not of the same effect throughout, and that with the energy that one is compelled to employ, the working or stirring movement at the surface is too violent and ruptures the superficial pellicle of oxide that forms and would otherwise protect the bath so that oxidation proceeds with a loss of yield.

An object of the invention is to control the working or stirring of the bath in such manner as to prevent or materially reduce the rupturing of the superficial pellicle of oxide and thus to protect the bath against oxidation, while achieving a sufficiently violent working to efficiently melt the metals in the furnace and, in the case of alloys, to mix them so thoroughly as to produce a uniformly constituted alloy.

In order to accomplish the objects of the invention, I have constructed an induction furnace which produces controllable currents of molten metal, the working of which upon the metal to be melted can be regulated. This furnace is provided with means which offer mechanical resistance to the working of the bath in order to limit its turbulence while at the same time conserving the power per unit of volume necessary to obtain a rapid and economical fusion.

The principles of the invention are illustrated in more or less detail in the figures of the drawing, which are generally diagrammatic, and illustrate the general principles and certain important modifications of the invention.

In the drawings,

Fig. 1 is a vertical section through a metallurgical furnace embodying principles of the invention taken on the line $x$—$x'$ of Fig. 2.

Fig. 3 is a similar vertical section on the line $x$—$x'$ of Fig. 4, and

Fig. 4 is a similar double section on the lines $y$—$y'$ and $z$—$z'$ of Fig. 3.

Figure 5:
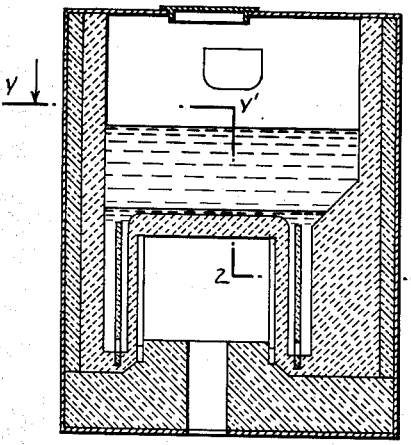
Figure 12:
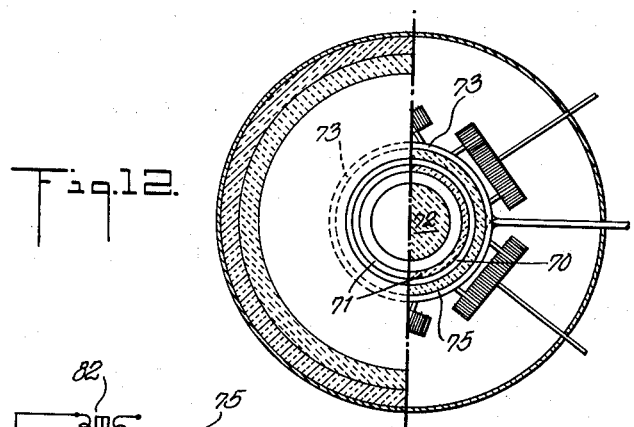
Figures 13, 14:
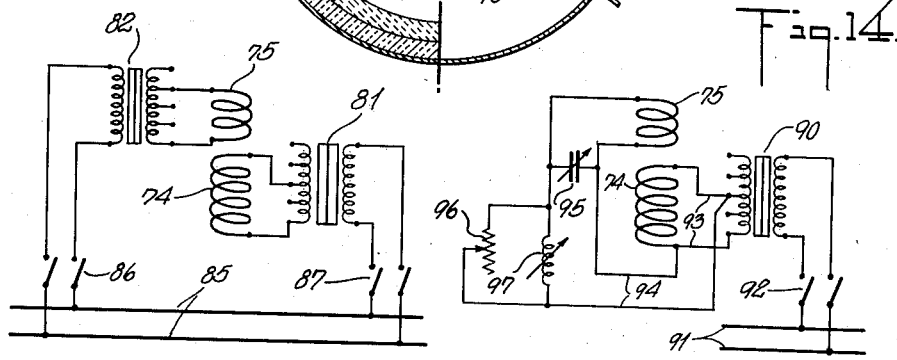

The same system of figures prevails throughout the drawings, Fig. 5, 7, 9, 11, 15, 17, 19 being vertical sections on the lines $x$—$x'$ of Figs. 6, 8, 10, 12, 16, 18, and 20, whereas the even numbered figures, except Fig. 14, are double sections on the lines $y$—$y'$, $z$—$z'$, respectively, of Figs. 5 etc. to 19.

Figs. 13 and 14 are diagrammatic representations of electrical circuits that are a valuable part of the invention.

Figure 2:
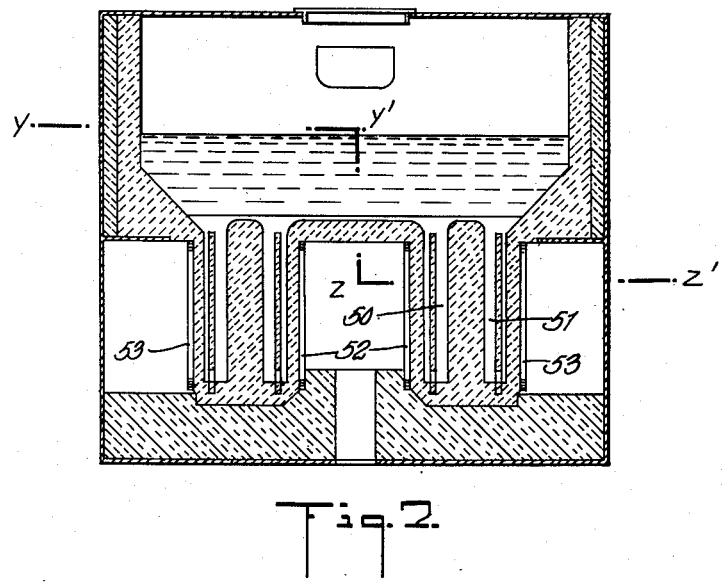
Fig. 2 is a section on two planes through the furnace of Fig. 1 the sections being taken on the lines $y$—$y'$ and $z$—$z'$.

Important general principles of the invention are set forth in the structure of Figs. 1 and 2 to which attention is now directed.

In Figs. 1 and 2 the numeral 30 indicates the base of an electrical induction furnace having an outer, upright, cylindrical wall 31, lined with a cylindrical refractory 32 having a conical wall area 33 terminating in an annular crucible 32'. A refractory stud 35 fills the center of the crucible and is provided with a flat top upon which heavier, undissolved metals may rest during fusion, as indicated at 36. The upper part of the furnace is provided with an additional layer 37 of insulation between the metal wall 31 and the refractory lining 32.

The inner wall of the crucible is formed by the circular stud 35 and the outer wall is formed by the inside of the cylindrical extension 32' of the refractory lining of the furnace. The crucible is consequently a relatively deep and relatively narrow chamber capable of holding molten metal but of excluding any relatively large solid pieces. Within this crucible is an annular dividing wall 38, spaced from both crucible walls, set in the refractory bottom of the crucible, and provided with holes 39 toward the bottom so that the metal in one compartment may circulate through the wall to the other circular compartment of the crucible.

Circumscribing the wall 32' of the crucible is inductance winding 40 by means of which the metal in the crucible is heated and by means of which it is made to work upon the undissolved metal in the shaft 41 of the furnace. The wall 38 is nearer to the outer than to the inner wall of the crucible in Fig. 1 of the drawing. Each inductance winding is fed with currents received from mains not shown through leads like 43—44 and transformers 42.

The metal heated by induction circulates upward about the plug 35, over the baffle 38, and down beside the outer wall 32' of the crucible, as indicated by the arrows. On its course it engages and works the metals to be melted, subjecting them to rapid fusion and insuring an even mixing of the several metals in an alloy.

The furnace is enclosed as shown at 45 and has a covered opening 46 through which raw materials may be added and inspections made.

The crucible may be burned in advance or set in place of packed clay. The annulus in the crucible may be made of a refractory or of metal covered with refractory luting.

The inductive winding may or may not have magnetic screens to canalize the return flux. The central post 35 is shown to be of large dimensions, in order to reduce the charge of metal in the crucible. It is preferably of greater height than annulus 38 in order to protect it against the shocks of falling pieces of solid matter. The dotted line 47 in the base indicates that the annulus and the post 35 can be made removable to facilitate upkeep if desired. In any case it is fixed to the body of the furnace during operations.

The circulation of the metal in the crucible may be intense and its temperature high. It gives up some heat to the metal above the post and accelerates its fusion. After some time the upper level of the bath will be at about 48, and an opening in the furnace wall will permit sampling and withdrawal of the melt.

It has been demonstrated that the best electrical yield is obtained when "e" has the value indicated by the formula $$e = 2\frac{\Sigma^2}{d}$$

$e$ being the width of the space between the wall of the crucible and the wall of the annulus in the crucible; $d$ being the exterior diameter of the crucible, and $\Sigma$ being the mean depth of current penetration in the substance to be melted for an inductive current of given frequency.

When the speeds of circulation and the depth of the liquid metal are acceptable the pellicle of oxide formed on the bath will not be ruptured, and at the end of the fusion the speed of circulation will be sufficient to obtain a good homogeneity in the melt. These two conditions are achieved for light metal alloys in the furnace of Fig. 1 if at every casting there is maintained in the furnace a metal depth above the induction winding of about $$h = \frac{d}{4} \text{ to } \frac{d}{5}$$

$h$ being the least depth of metal at the end of casting and $d$ being the exterior diameter of the crucible. At the end of a fusion the depth $h'$ above the induction coil may be equal to about $$\frac{2d}{3} \text{ or } \frac{4d}{5}$$

The stirring working of the bath can also be altered by altering the height of the openings 39 above the lower end of the winding.

In order that the whole of the charge may be conveniently worked or stirred it is convenient to adopt for the value of $d$ between .4 F and .85 F, F being the diameter of the shaft.

The difference in temperature in such furnaces is very small between the depths of the crucible and the surface of the bath, so that the bath has a definite and controllable temperature.

Mono or polyphase current may be used at normal, medium or other frequency. If polyphase current is used the inductive winding unit may be divided in as many parts as the current has phases, every section being connected to the main of one phase. One may also use one heating element by each current phase, which is preferable for large furnaces.

The power factor of such a furnace being low, it is advisable to use a battery of condensers of convenient size to raise it to the neighborhood of unity.

The furnace may be easily made tight and operations carried out in inert atmosphere or under light vacuum for the working of highly oxidizable metals if desired.

The same principles apply in general to the furnaces of Figs. 3–20, which contain valuable modifications and will now be discussed.

In Figs. 3 and 4 the central plug or post 35' is hollow and the inductive winding 40' is on the inside of and circumscribed by the inner wall of the crucible. In this case the circulation in the crucible is upward on the outside of the annulus 38 and downward on the inside.

Figure 6:
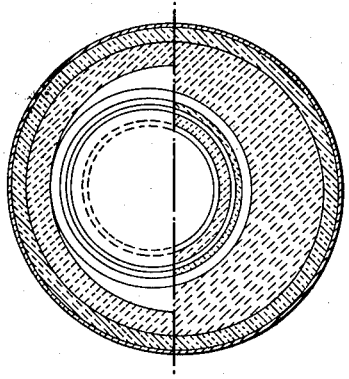

In Figs. 5 and 6 the crucible is offset with respect to the axis of the shaft of the furnace, but otherwise it is structurally akin to Figs. 3 and 4.

Figure 8:
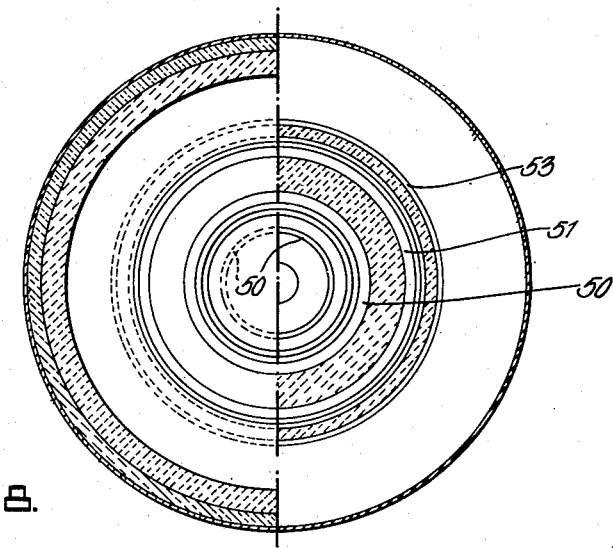

In Figs. 7 and 8 is illustrated a very large furnace having inner and outer concentric crucibles 50—51, the inner of which is mainly worked by winding 52 and the outer by winding 53. The circulation is upward in adjacent and downward in remote parts of the two crucibles.

Figure 9:
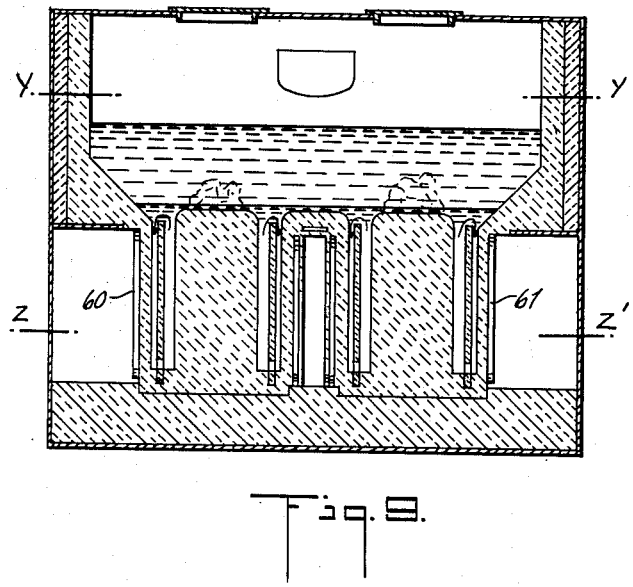
Figure 10:
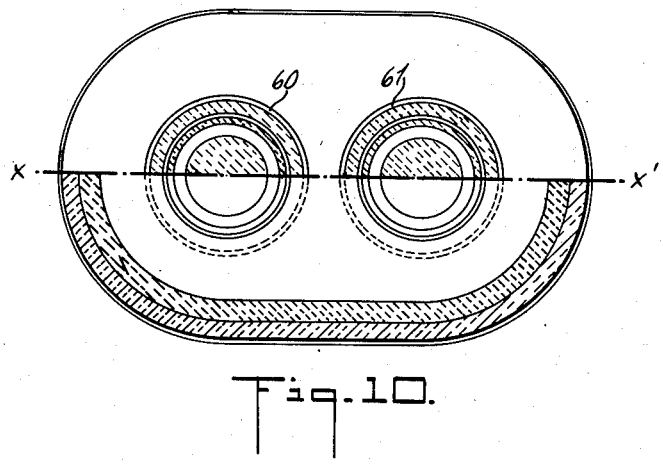

In Figs. 9 and 10 the crucibles are side by side and heated by encircling coils 60—61, respectively.

The induction furnaces of the type described hereinbefore have the particular advantages that the working of the bath is controllable so that the oxide pellicle that forms on the surface of the bath by contact with the air and which forms a protective coating is not ruptured by the working of the bath even though that working is sufficiently vigorous to produce very efficient melting and mixing of the solid ingredients. The controlled circulation of the molten metal is achieved by the combination of the crucible structure and inductive heating. This is a novel combination giving results of very great superiority. This construction involves a deep crucible of narrow width having a partition provided with holes toward the bottom of the crucible which permit the circulation of the melt from one side to the other. Particular advantages spring from the applicant's discovery of the practical value of the definite size relationships set forth in the foregoing formulas.

Figure 11:
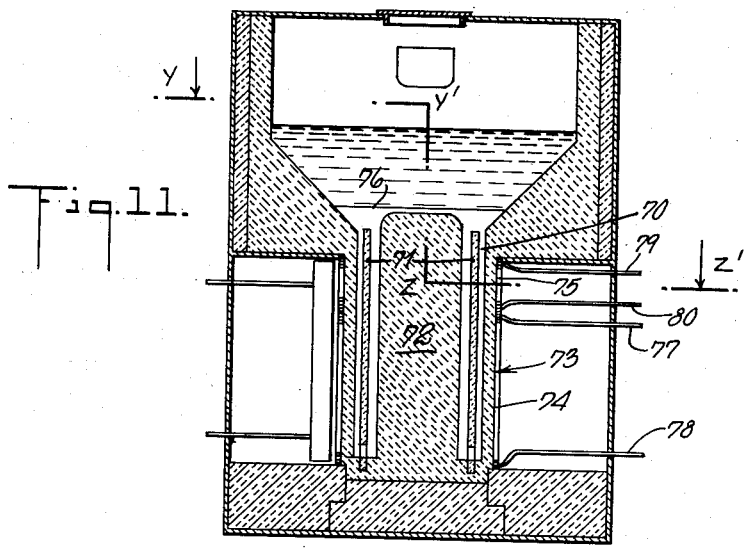

In the form of the invention illustrated in Figs. 11 and 12 the furnace is provided with a relatively tall crucible 70 in which is the perforated annulus 71 and the central plug 72. In this case the inductive winding which is given the general numeral 73 is in two aligned coils 74, 75. The coil 74 is about the lower part of the crucible, its upper turns being quite far below the lowest level 76 to which the surface of the bath is allowed to sink on casting. Consequently, this coil serves the general purpose of heating only.

The working of the bath is accomplished by the shorter coil 75 which is mounted above the coil 74. This coil is responsible for practically all the working of the bath. The coil 74 is fed with current through leads 77, 78 and the coil 75 through leads 79, 80. These leads may be taken from a single power line or may be taken from different power lines. They may be of the same type or different types of electricity, for instance of different phase. Coil 75 may be adjusted in its output separately from coil 74. This enables the operator of the furnace to achieve the highest efficiency in both heating and working.

In Figs. 13 and 14 are shown two representative hookups for the furnace of Figs. 11, 12. In Fig. 13 the transformer 81 feeds from its secondary the coil 74 and the transformer 82 feeds from its secondary the coil 75. Both transformers are served with current by the power lines 85. It is possible, as shown by the switches 86, 86, to employ a single one of the coils to the exclusion of the other. The control of the output of coils 74, 75 can be accomplished by suitable instrumentation attached to the secondary of the transformers or otherwise if desired.

In Fig. 14 both coils are fed through a single transformer 90 the primary of which receives its current from a power line 91 through switch 92. The secondary of the transformer serves the coil 74 through connections 93 and the coil 75 through connections 94. Elaborate control of the coil B is provided by a variable condenser 95 across its terminals, a rheostat 96 in one of the wires of the line 94, and a variable inductance 97 across the rheostat.

The two parts of the inductive winding may be furnished with current of different frequency or of the same frequency. Thus the heating coil may employ a current of high frequency while the working coil operates at normal frequency. The transformers 81, 82 are furnished with multiple contacts by which the output of the coils 74, 75 can be conveniently varied. This apparatus also may be used when the crucible and the annulus of the heating element are metallic and not of refractory material. Particular advantages of the structure of Figs. 11 to 14 are that the inductive winding is divided into two parts one of which serves almost entirely for heating and the other almost entirely for the working of the bath. Being independently adjustable a very fine control and superior results are obtained by these structures.

The heating coil acts in the lower part of the crucible while the working coil, being smaller, is situated between the top of the first coil and the lowest level reached by the molten metal in the working of the furnace.

Figure 15:
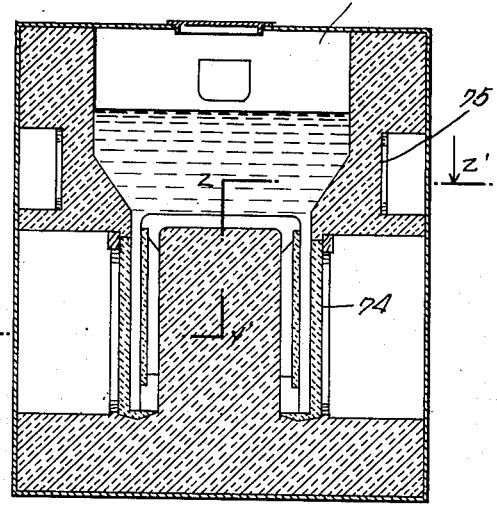
Figure 16:
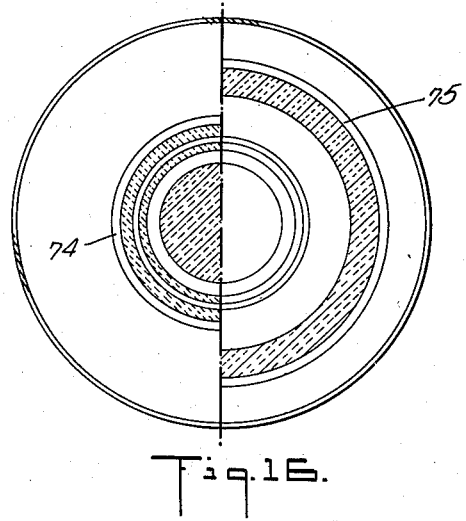

In the furnace shown in Figs. 15 and 16 the heating coil 74 and the working coil 75 are concentric but separated by a relatively wide distance and being different in location. In this case, as usual, the heating coil 74 is about the crucible, and is furnished with current in any suitable way. On the other hand, the smaller working coil 75 encircles the lower portion of the shaft 41 of the furnace wherein is found the bulk of the molten bath. The working is therefore applied to this portion of the body of the metal rather than to the upper portion of the metal in the crucible. The diameter of the working coil is considerably larger than that of the heating coil.

Figures 17, 19:
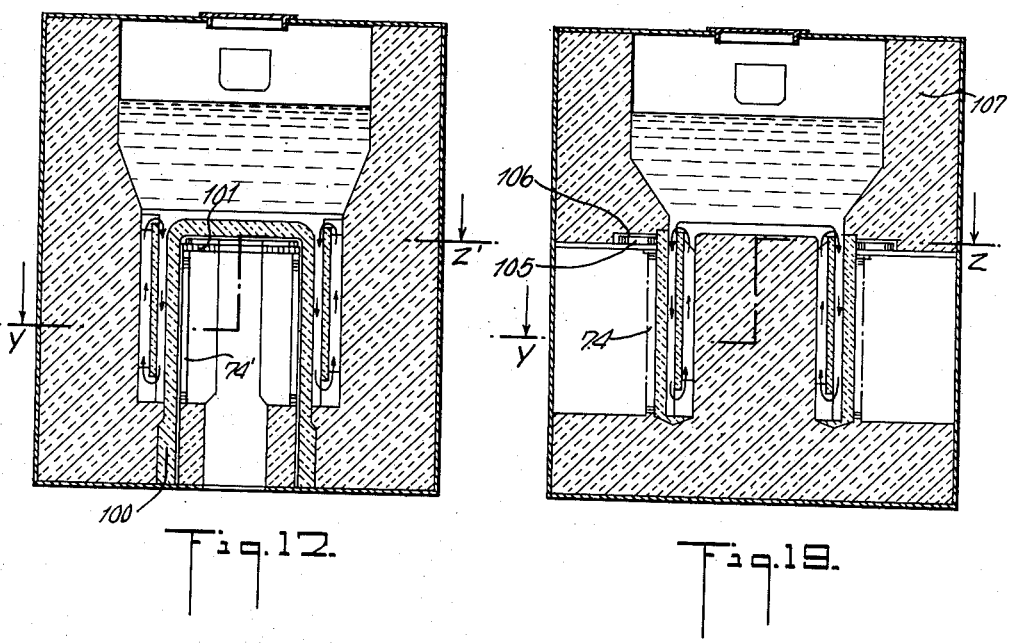
Figures 18, 20:
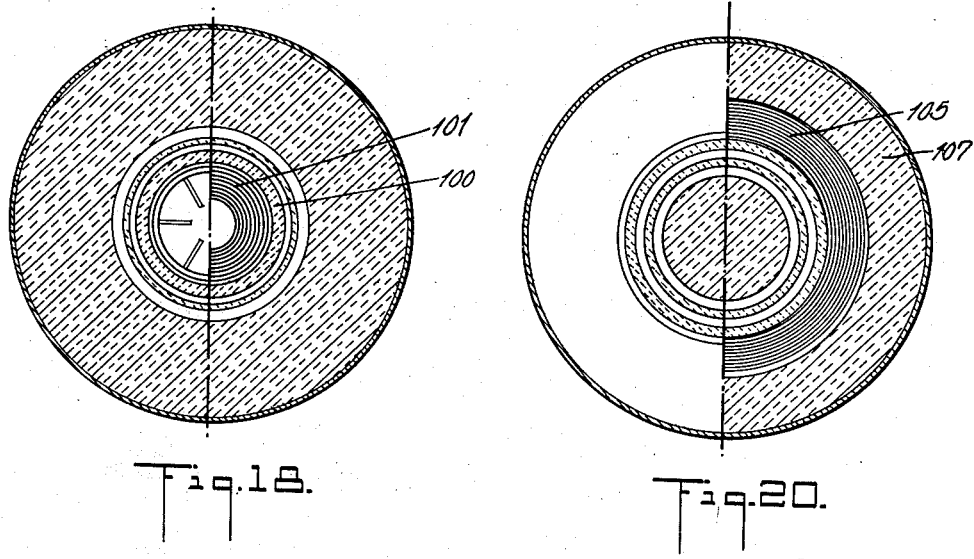

In Figs. 17 and 18 the furnace is provided with a hollow post or plug 100 within which is a heating coil 74' which serves to heat the metal in the crucible by induction. The working coil on the other hand is given the numeral 101 which is in the form of a horizontal spiral which is mounted in the upper part of a hollow refractory plug 100. In this form of the invention the main effect of induction is upward toward the metal located above the top of the plug and the working therefore tends to occur more centrally in the shaft of the furnace than in some of the forms of the invention hereinbefore described.

In Figs. 19 and 20 the heating coil 74 is located about the crucible whereas the spiral working coil 105 is horizontally placed about the upper end of the annulus in the upper region of the crucible in a groove 106 prepared for it in the lower portion of the wall 107 of the furnace. In the structure of Figs. 19 and 20 the working coil is reduced to one portion of a horizontal spiral.

By means of the forms of the invention in Figs. 15 to 20, the advantage is obtained that the working coil surrounds the bath of melted metal. Furthermore, it is made up of a spiral or a fraction of a spiral situated toward the upper end of the crucible of the furnace outside the crucible or in a cavity within the crucible beneath the melted metal. For certain operations these arrangements are very valuable.

As many apparently widely different embodiments of the invention may be made without departing from the spirit and scope thereof, it is to be understood that the invention is not limited to the specific embodiments except as defined in the appended claims.

What is claimed is:

1. A metallurgical furnace having a shaft for the reception of molten metal terminating at its lower end in an annular crucible that is divided by an annulus perforated toward the bottom of the crucible, said annulus defining two chambers opening into the shaft at their upper ends, and induction means to heat the annular crucible.

2. The furnace of claim 1 in which the induction means includes a winding in concentric relation to the annular crucible.

3. The furnace of claim 1 in which there are a plurality of annular crucibles opening at their tops into a single shaft.

4. The furnace of claim 3 in which a plurality of said crucibles are concentric.

5. The furnace of claim 3 in which a plurality of said crucibles are side by side.

6. The furnace of claim 1 having a plurality of induction windings.

7. The furnace of claim 6 having an induction winding directed upon the shaft and an induction winding directed upon the crucible.

8. The furnace of claim 7 in which the winding directed upon the shaft is helical and is located beneath the shaft.

9. The furnace of claim 6 in which there are a plurality of induction windings in concentric relation to the crucible and to each other.

10. The furnace of claim 1 in which the shaft

| Number | Name | Date |
|---|---|---|
| 1,595,968 | Unger | Aug. 10, 1926 |
| 1,599,161 | Brayton | Sept. 7, 1926 |
| 1,645,074 | Seede | Oct. 11, 1927 |
| 1,694,791 | Northrup | Dec. 11, 1928 |
| 1,694,792 | Northrup | Dec. 11, 1928 |
| 1,756,457 | Fourment | Apr. 29, 1930 |
| 1,805,469 | Dufour | May 19, 1931 |
| 1,824,618 | Northrup | Sept. 22, 1931 |
| 1,837,031 | Engelhardt et al. | Dec. 15, 1931 |
| 1,838,527 | Clamer | Dec. 29, 1931 |
| 1,863,185 | Bunce et al. | June 14, 1932 |
| 1,878,532 | Northrup | Sept. 20, 1932 |
| 2,019,112 | Beekhuis | Oct. 29, 1935 |
| 2,063,401 | Rossman | Dec. 8, 1936 |
| 2,101,675 | Ferguson | Dec. 7, 1937 |
| 2,280,571 | Dionisotti | Apr. 21, 1942 |
| 2,286,024 | Tama et al. | June 9, 1942 |
| 2,375,049 | Tama et al. | May 1, 1945 |